March 6, 1962
L. T. BARNES
3,023,745
SUPPLEMENTAL AIR BY-PASS SYSTEM FOR
INTERNAL COMBUSTION ENGINES
Filed Dec. 19, 1960
2 Sheets-Sheet 2
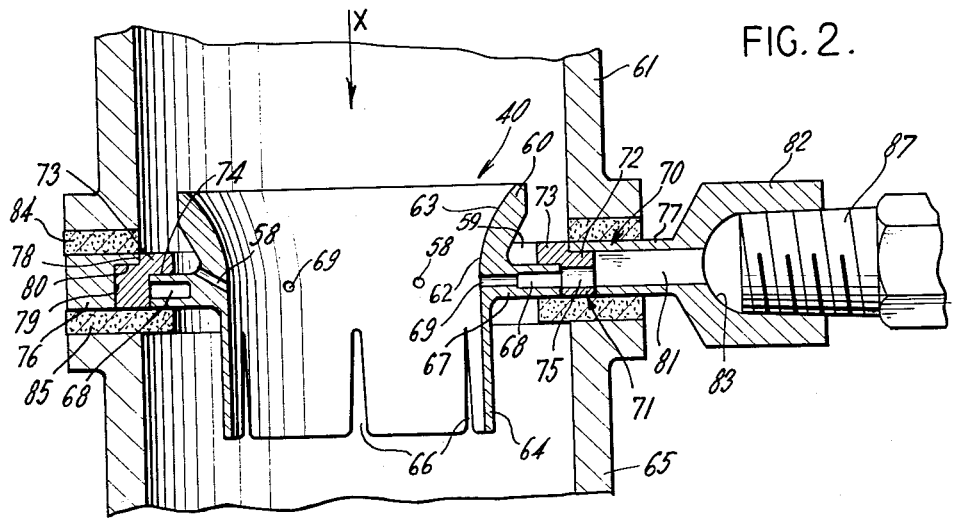
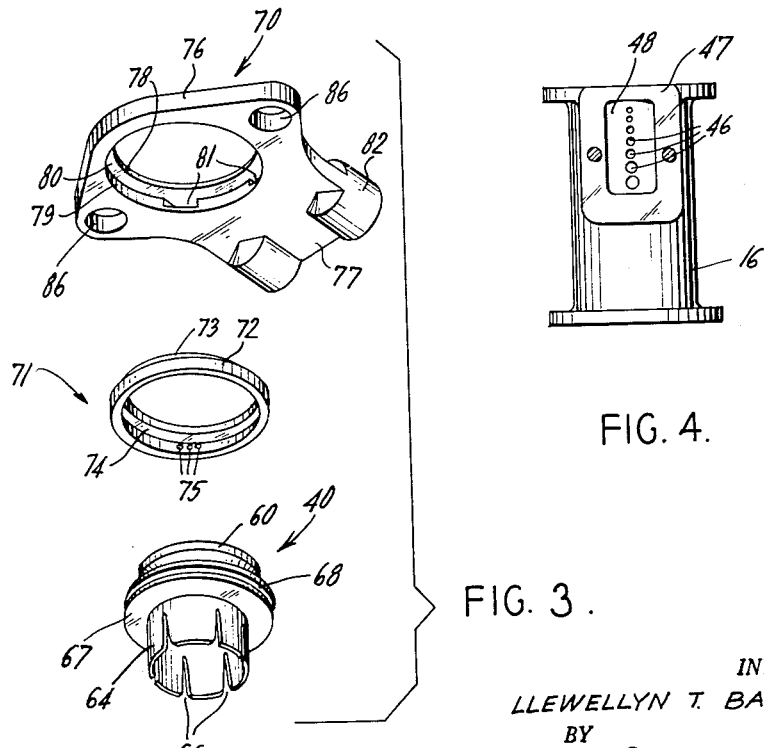
INVENTOR.
LLEWELLYN T. BARNES
BY
Amster & Levy
ATTORNEYS

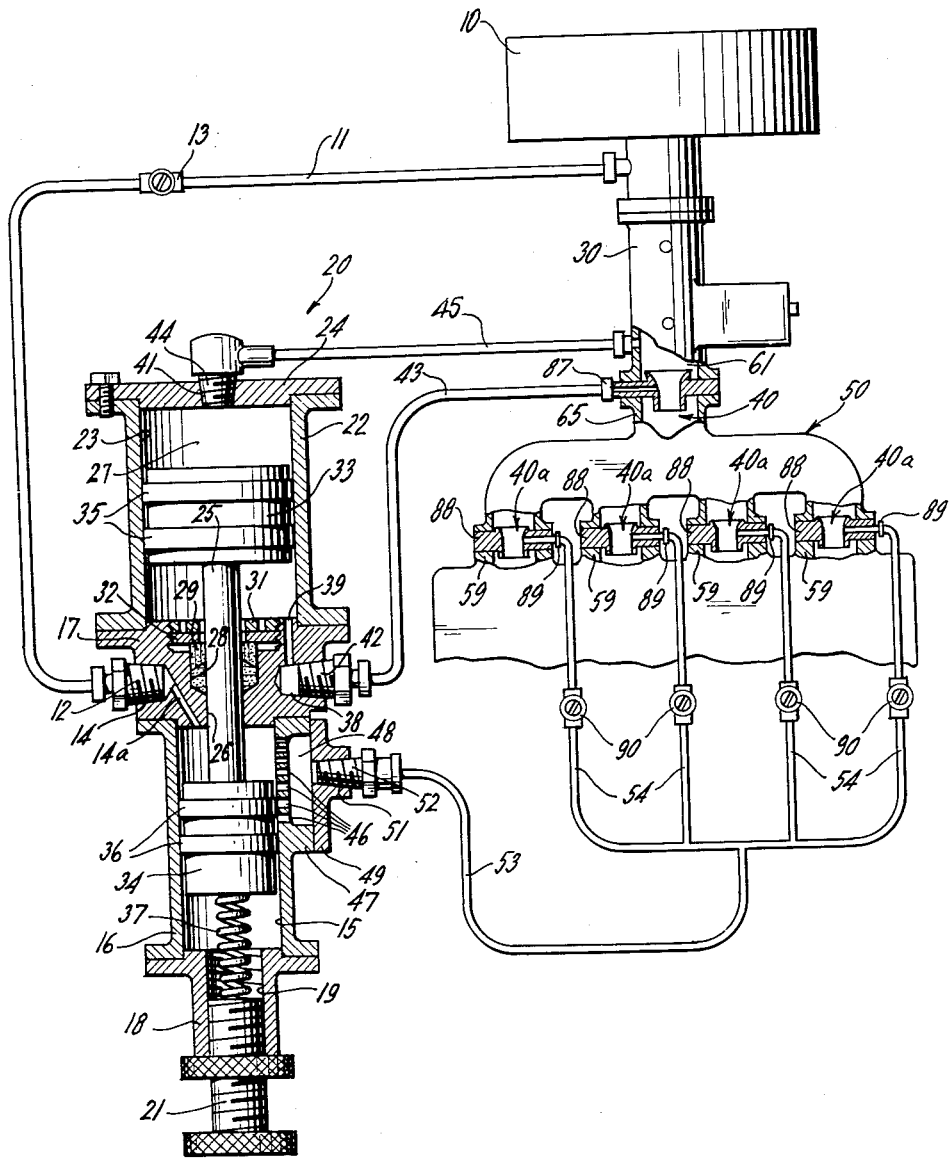

United States Patent Office 3,023,745
Patented Mar. 6, 1962

3,023,745
SUPPLEMENTAL AIR BY-PASS SYSTEM FOR INTERNAL COMBUSTION ENGINES
Llewellyn T. Barnes, 155 Atlantic Ave., Freeport, N.Y., assignor of one-third to Charles T. Barnes and one-third to John F. Woog, Garden City, N.Y.
Filed Dec. 19, 1960, Ser. No. 76,645
13 Claims. (Cl. 123—124)

The present invention relates to improvements in fuel-air mixture distributing systems for multiple-cylinder internal combustion engines, and in particular relates to a novel and improved system which is readily insertible in existing engines and is capable of supplying supplemental air to the air-fuel mixture supplied to the individual engine cylinders.

Conventional engine carburetors are required to deliver to the engine cylinders mixtures of fuel and air in percentages determined by the engine load, engine speed, or both. Partially-open throttle operations require a lower ratio of fuel-to-air than full throttle operations under load or gradient. Even with correct carburetor settings, the engine operation is subject to inertia in fuel flow which produces an incorrect fuel-air mixture. During engine operation under load with the throttle opened, the flow through the carburetor fluctuates. The velocity of air drawn through the carburetor varies as the velocity of the engine piston and the velocity of fuel fed should vary in the same manner in order to maintain consistency of the mixture. However, because of the greater weight of the liquid fuel as compared to air, the fuel displays greater inertia or resistance to change of velocity, so that under continually changing running conditions, there is constantly either an excess or deficiency of fuel in the mixture, causing incomplete combustion and the release of obnoxious or poisonous gasses.

Improper engine combustion is also caused by the inherent differences in the individual engine cylinders and their effective operation. Despite these differences, conventional carburetor systems are restricted to feeding the same fuel mixture to all the cylinders through a common manifold. This results in misfiring and incomplete combustion in some of the cylinders with resultant emission of fumes and decrease in fuel economy.

Improper engine combustion produces poisonous carbon monoxide gas as well as nauseous impure hydrogen gas. In addition, lubricating oil sucked up into the combustion chamber during high-vacuum overrunning conditions with the carburetor closed and the piston rapidly reciprocating, liberates sulphur dioxide upon contact with hot surfaces which, when moisturized, excapes as vaporized sulphurous acid. These factors result in the emission of an obnoxious exhaust, dangerous to health. An object of the invention is to provide a uniform and proper combustion in all engine cylinders, eliminating undesirable exhaust characteristics by minimizing carbon dioxide, adapting hydrogen to useful work, and reducing the undesirable effects of sulpher dioxide production.

In accordance with the invention, a supplemental air supply system is provided which includes a master venturi device inserted between the carburetor fuel mixture supply and the engine manifold. Auxiliary venturi devices are also inserted at the fuel mixture entrance of each engine cylinder, that is to say, between the manifold and the cylinders. An air regulator device is connected to the air source, that is, to the air cleaner, and to the auxiliary venturi devices in such a manner as to supply supplemental air to the fuel-air mixture being fed to the engine cylinders. The air regulator device is connected to and controlled by the main venturi device in such a manner to be automatically responsive to pressure conditions between the carburetor and manifold intake. The supplemental air supply is thus a by-pass system outside of the main carburetor system although controlled automatically thereby, and responsive to the vacuum resulting from engine running conditions. Valve means are also associated with each of the engine cylinders for individually controlling the amount of supplemental air supplied to each of the engine cylinders.

The system of the invention provides optimum mixture proportions during various conditions such as at cruising, at low speed, during idling, and during overrunning of the engine. Increased atomization, intermixture and homogeneity result during all operating conditions. The supplemental supply of air added to the mixture reduces the high vacuum in the cylinders when the throttle is closed during overrunning conditions. The supplemental air mixes with the idling mixture in the throats of the venturi-like devices or compensators during idle-running conditions of an engine when a high vacuum is present also in the manifold.

An object of the invention is to provide a simple mechanism which may be readily combined with and installed in internal combustion engines, which mechanism provides an homogenized proper fuel and air mixture throughout the entire operating range of the engine, even during special conditions such as idling or overrunning.

Another object of the invention is to improve the fuel-air mixture in the low speed running range of an engine, especially during idling, to provide optimum economy of fuel use and to reduce obnoxious odors.

Another object of the invention is to improve engine performance by reducing irregularities of fuel vapor flow to a satisfactory condition without substantial alternation of the existing engine-manifold-carburetor assembly in a vehicle.

Another object of the invention is to provide fuel and oil economy, cause less carbon deposit, less crank case dilution and reduce repairs while providing safety and economy use of vehicular engines.

Still another object of the invention is to provide balance in distribution of fuel vapor to the various cylinders of a multiple cylinder engine, and to provide for optimum quality of vapor in order to obtain the proper mixture in each cylinder.

A further object of the invention is to provide uniform compression throughout an engine system and to provide a compensation of the detrimental waves and surges developed in the main manifold of the engine system.

Additional objects and advantages of my invention will become apparent during the course of the following specification when taken in connection with the accompanying drawings, in which:

FIG. 1 is a schematic view showing the fuel distribution system of the invention incorporated in an automobile engine, with the regulator device of the system shown in section and portions of the engine carburetor and manifold broken away to reveal the incorporation of portions of the fuel distribution system;

FIG. 2 is an enlarged cross-sectional view of a portion of the engine carburetor showing the primary venturi of the fuel distribution system mounted therein;

FIG. 3 is an exploded view of the venturi device, adapter and interconnecting bracket used in the system of the present invention, and FIG. 4 is a front elevational view of a portion of the regulator device of FIG. 1, showing the graduated air openings for admitting air to the several venturis attached to the engine cylinders.

Referring in a detail to the drawings, FIG. 1 shows schematically a portion of an internal combustion engine incorporating the distribution system of the present invention. This engine portion includes a conventional air cleaner intake 10 which supplies atmospheric air to a conventional engine carburetor designated generally by reference numeral 30. Within the carburetor, the air mixes with the gasoline supplied by fuel injection means (not shown), and the mixture is fed into the engine manifold 50 and thence to the engine cylinders 59.

In accordance with the invention herein, there is incorporated in this usual carburetor arrangement a fuel distribution system which includes a main venturi device 40 mounted within the throat or outlet portion of the carburetor 30, a series of auxiliary venturi devices 40a respectively mounted at the fuel inlet of each engine cylinder 59, and an auxiliary air regulator device 20 controlled by the main venturi 40 and arranged to feed an additional air supply to the auxiliary venturis 40a.

The auxiliary air regulating device 20 includes a central main body portion 17 having a threaded air inlet opening 14. Air is supplied thereto directly from the air cleaner 10 through a conduit 11 connected to and communicating with the air cleaner 10 above carburetor 30 and connected at its other end to the air inlet opening 14 by a threaded coupling 12. The conduit 11 has a control valve 13 disposed intermediate its ends for manual regulation of the air flowing therethrough.

Mounted on the lower end of the regulator body portion 17 is a cylindrical member 16 forming therein a cylindrical bore 15 serving as an air chamber for the regulator device 20. A bore 14a extending through the body portion 17 connects the air inlet opening 14 with the interior of the air chamber 15. The upper end of the air chamber 15 is closed off by the body portion 17. The lower end of air chamber 15 is closed off by an end cap 18 secured to the bottom end of cylindrical member 16 and having a longitudinally extending through bore 19 which is internally threaded. An adjusting screw 21 is threadedly mounted in the bore 19 for a purpose to be presently explained.

A second cylindrical member 22, of larger diameter than the cylindrical member 16, is mounted at the top end of regulator body portion 17. The member 22 has a central cylindrical bore 23 closed off at its upper end by an end cap 24. The bore 23 also constitutes an enclosed air chamber 27 within the regulator device 20 and is closed off at its bottom end by the body portion 17.

A piston rod 25 extends slidably through an aperture 26 in the body portion 17 with its opposite ends extending respectively into the upper air chamber 27 and the lower air chamber 15. The body portion 17 is also provided with an enlarged central counterbore 28 communicating with the aperture 26 and containing a packing 29 through which piston rod 25 extends. The packing 29 is compressed by threaded discs 31 and 32 which are tightened against its upper surface.

One end of piston rod 25 carries a first piston 33 which is contained within the upper air chamber 27 for sliding reciprocation therein. The opposite end of piston rod 25 carries a second piston 34 which is slidable in the lower air chamber 15. The first piston 33 is provided with the usual piston rings 35 for making an air-tight sliding fit with the inner wall surface of upper cylindrical member 22, while the second piston 34 is similarly provided with rings 36.

A compression spring 37 is seated at one end on the adjusting screw 21 which is formed with a hollow recess (not shown) for receiving said spring. At its other end the spring 37 is seated on the bottom surface of the second piston 34. The spring 37 biases the second piston 34, the piston rod 25 and the first piston 33 upwardly during operation of the air regulator device 20 so that the various air pressures controlling operation of the regulator device must work against this spring tension. The adjusting screw 21 may be turned as desired to selectively adjust the tension of spring 37 during such operation.

The regulator body portion 17 also has a vacuum inlet opening 38 arranged opposite the air inlet opening 14. A bore 39 connects the interior of the upper air chamber 27 below piston 33 with the vacuum inlet opening 38. The end cap 24 also contains a pressure relief opening 41 communicating with the interior of the upper air chamber 27 above piston 33. The vacuum inlet opening 38 is connected by a threaded coupling 42 to one end of a pike or conduit 43, the other end of which is connected to the main venturi device 40 in a manner to be presently described. The pressure relief opening 41 is connected by a threaded coupling 44 to a pipe 45, the other end of which is connected to the carburetor 30 in communication with the outlet portion or throat thereof at a point above the main venturi device 40, as clearly shown in FIG. 1.

The wall of lower cylindrical member 16 contains a longitudinal row of air outlet apertures 46 which are graduated in size from a very small diameter at the top of the row to the largest diameter at the bottom of the row, as shown in FIGS. 1 and 4. Bordering this row of apertures 46 is a laterally-projecting rectangular flange 47 which forms an air chamber 48 at the outer surface of the cylindrical member 16. As shown in FIG. 1, the air chamber 48 is closed off by a plate 49 having an outlet opening 51. A threaded coupling 52 secured to one end of a pipe 53, is connected to the outlet opening 51. The pipe 53 divides into branches 54 which are respectively connected to the auxiliary venturi devices 40a between the engine manifold 50 and the cylinders 59. Each of the branches 54 is provided with an air flow regulating valve 90 which are adjustable for controlling the amount of air flow to each individual cylinder 59 and thereby provide a balanced and uniform flow to the cylinders. It should be understood that while four engine cylinders 59 are shown herein for convenience of illustration, the system is intended to be used in any engine regardless of the number of cylinders.

It may be observed at this point that the air fed from the air cleaner 10 through conduit 11 and air inlet opening 14, passes through bore 14a into the interior of air chamber 15 above the piston 34. This air then leaves the air chamber 15 through the outlet apertures 46 flowing through the chamber 48 and outlet opening 51 to pipe 53 and thence to the auxiliary venturi devices 40a between the engine manifold and the cylinders. The amount of air flowing through the outlet apertures 46 is determined by the position of the second piston 34. In FIG. 1, piston 34 is positioned to cover over and close off about half of the apertures 46 at the lower end of the row. If the piston 34 is raised from this position, it will cover over and close off more of the apertures 46, permitting less air to be delivered to the auxiliary venturis 40a. Conversely, if the piston 34 is lowered, it will uncover more of the apertures 46, permitting a greater flow of air through the regulator device 20.

The carburetor 30 is of the usual induction type and communicates with the intake manifold to supply the latter with a fuel and air mixture. The internal construction of such carburetor 30 is conventional and well-known so that it is not illustrated herein. It will be understood, however, that the fuel supply, a mixture of air and liquid gasoline, is formed within the carburetor and travels in the direction X indicated in FIG. 2.

Disposed downstream of the carburetor throttle valve and between the carburetor 30 and the manifold 50 is a combined fuel mixture and degasser element in the nature of main venturi device 40. The device 40 is illustrated and fully described in my United States Patent No. 2,146,246, issued on February 7, 1939. The structure of the element 40 will therefore be described herein only in sufficient detail to afford an understanding of the invention. The device 40 acts upon the stream of fuel charge issuing from the carburetor during operation of the engine and assists in greater atomization and homogenizing of this stream as well as providing means for the introduction of supplemental air to the fuel mixture, as will be presently described.

The venturi device 40, best seen in FIGS. 2 and 3, comprises a tubular venturi-like body 60 of a lesser diameter than the internal diameter than the exit portion 61 of the carburetor 30 in which it is mounted. The tubular body 60 defines an arcuate throat 62 and a conical entrance mouth portion 63. The mouth portion 63 is sized to receive a major portion of the stream of fuel and air mixture issuing from the venturi section of the carburetor into the exit portion 61. Integrally formed with the body 60 on the down-stream side of the throat 62 is a skirt portion 64 extending into the intake manifold entry port 65. The skirt portion is provided with a plurality of V-shaped slots 66 to allow gradual expansion of the stream emitted by the venturi device 40.

The body 60 is also provided with an integral, annular flange 67 extending transversely from the exterior of the body 60 in alignment with the arcuate throat 62. The flange 67 is provided with a peripheral groove 68 containing a plurality of spaced apertures 69 which communicate with the interior of the throat 62.

The venturi device 40 is mounted within the engine by an interconnecting member 70, and is provided with an adapter 71 to afford communication with the interconnecting member 70. The adapter 71 is in the nature of a metallic ring 72 having an upstanding annular flange 73 of lesser diameter and forming an internal shoulder 74. A plurality of apertures 75 are provided in one section of the circumferential wall of ring 72 for air passage therethrough.

The external diameter of the venturi flange 67 is equal to the internal diameter of ring 72. In assembly, the flange 67 is inserted into the ring 72 as shown in FIG. 2, with the upper edge of flange 67 seating upon shoulder 74. The apertures 75 of ring 72 thus communicate with the apertures 69 in the venturi throat 62 through the peripheral groove 68 in flange 67.

The interconnecting member 70 may be cast, machined, or otherwise die cast or pressure formed from die cut metal, and is generally T-shaped, having a main body portion 76 shaped to conform to the cross-section of the carburetor exit portion 61 and the manifold entry port 65. Integral with the main body portion 76 is a trunk portion 77 which projects from the carburetor exit portion 61 when the member 70 is in its mounted position shown in FIG. 2.

The main body portion 76 contains on its upstream surface a central circular opening 78, and on its downstream surface a circular bore 79 of slightly lesser diameter which extends to the circular opening 78 and forms therewith a shoulder 80. The circular opening 78 is of a diameter equal to the external diameter of the ring flange 73 while the bore 79 is of a diameter equal to the external diameter of ring 72. The adapter 71 is thus inserted into the interconnecting member 70 with an accurate fit, as shown in FIG. 2, in which mounted position, the top surface of the flange 73 is substantially flush with the top surface of the body portion 76 and the bottom surface of ring 72 is substantially flush with the bottom surface of body portion 76.

The adapter 71 permits the ready interchangeability of the venturi devices 40 for various purposes. For example, the ring 72 may be removed and a venturi device 40 of large size inserted in the adapter 71 when high engine speeds are desired, as for racing. Conversely, the ring 72 may be sized to receive a venturi device 40 of smaller size for governing the maximum engine speed for safety purposes.

A pair of elongated, rectangularly-shaped bores 81 extend longitudinally through the trunk portion 77. The bores 81 each open at one end in the central circular bore 79 and at their outer ends extend into cylindrical mounting sections 82 of the trunk portion 77, communicating with threaded bores 83 in the outer ends of said mounting sections 82. The adapter 71 is so mounted that its row of apertures 75 communicates with the mouth of one of these rectangular bores 81. Communication is therefore provided between the throat 62 of venturi device 40 and the interior of one of the mounting sections 82 through the apertures 69, the peripheral groove 68 of flange 67, the ring apertures 75 and the communicating rectangular bore 81. The other rectangular bore 81 is a blind bore and its mounting section 82 may be sealed off as by a plug (not shown). It is available, however, in case of clogging of the rectangular bore in use, for ready servicing and repair without replacement of parts. It may also be used for connection of an auxiliary device, for example an auxiliary air supply unit responsive to the hand brake mechanism. The interfitted unit, consisting of the main venturi device 40, the adapter 71 and the interconnecting member 70, may be easily assembled within an automotive engine without drilling or otherwise altering the engine parts. For this purpose, the joint between the carburetor exit portion 61 and the manifold entry port 65 is separated, and the unit merely inserted therebetween. Gaskets 84 and 85 are provided to effect a tight seal at this joint, and the gasket 85 also projects inwardly sufficiently far to support the annular flange 67 of the venturi device 40, as well as the adapter 71, and to prevent the latter parts from falling out of the interconnecting member 70. As shown in FIG. 3, the interconnecting member 70 is provided with a pair of offset apertures 86 sized and positioned to allow passage therethrough of bolts (not shown) which are customarily employed to clamp together the joint between the carburetor exit portion 61 and the manifold inlet 65. Thus the assembled venturi unit is tightly clamped in mounted position.

The threaded bore 83 of mounting section 82 is sized to receive a threaded coupling member 87 connected to the end of pipe 43. In this way, the interior of venturi device 40 is connected in communication with the interior of the upper air chamber 27 in air regulator device 20.

Each of the auxiliary venturi devices 40a is identical in construction to the main venturi device 40 described above, although scaled to a smaller size, and each is provided with an adapter and interconnecting member indicated schematically by reference numeral 88 in FIG. 1 and identical in construction to the adapter 71 and interconnecting member 70 previously described. The venturi devices 40a are mounted in the joints between the manifold 50 and the engine cylinders 59 in the manner previously described. As shown in FIG. 1, the pipe branches 54 are connected by threaded couplings 89 to the interiors of the respective auxiliary venturi devices 40a through adapters and interconnecting members 88. Each of the pipe branches 54 is provided with an air control valve 90 for a purpose to be presently explained.

With reference to FIG. 2, it will be seen that in the main venturi device 40 (as well as the similarly-constructed auxiliary venturi devices 40a), the body wall at the mouth portion 63 forms with the wall of carburetor exit portion 61 and ring 72 an annular external pocket which communicates with the venturi throat 62 through bores 58 which alternate with the apertures 69. Liquid fuel condensing above the venturi devices 40 and 40a tends to run along the carburetor and manifold walls and collect in these pockets. Under normal operating conditions, the reduction of pressure created at the venturi throat 62 draws any liquid or "heavy ends" in the pocket into the venturi throat via the bores 58, this liquid fuel being then subjected to the stream of incoming supplemental air entering the throat through apertures 69 where it is mixed with the fuel-air mixture passing therethrough as a homogenous vapor.

Operation

With the engine in cruising condition, air is supplied from the air cleaner 10 to the carburetor 30 in which it mixes with fuel fed therein. The air-fuel mixture flows to the carburetor exit portion 61 and through the main venturi device 60 therein to the manifold 50 from which it is distributed to the various engine cylinders 59. In passing from the manifold 50 to the cylinders 59, the air-fuel mixture flows through the respective auxiliary venturi devices 40a.

In accordance with the invention herein, auxiliary air is supplied to the air-fuel mixture at the entrance of each engine cylinder, the auxiliary air being drawn from air cleaner 10 through pipe 11, and flowing through regulator 20, pipe 53 and pipe branches 54 to the interiors of the auxiliary venturi devices 40a in which it is added to the air-fuel mixture passing therethrough into the cylinders. The quantity of air supplied to pipe branches 54 depends upon the position of piston 34 within the air regulator device 20. The position of piston 34 in turn depends upon pressure conditions within the main venturi device 40.

When the engine is operating, the rapid flow of the air-fuel mixture through the auxiliary venturis 40a creates a vacuum condition therein which draws auxiliary air from the air cleaner 10. This auxiliary air flows through pipe 11 and valve 13 to the air inlet opening 14 of regulator device 20, and thence through bore 14a, air chamber 15, outlet apertures 46, air chamber 48, and outlet opening 51 to the pipe 53. From pipe 53, the auxiliary air is distributed to the pipe branches 54 and flows through the respective valves 90 to the auxiliary venturi devices 40a, flowing through the apertures corresponding to apertures 69 in main venturi device 40 (FIG. 2) into the interior of the auxiliary venturi devices 40a and mixing with the air-fuel mixture supplied to the corresponding engine cylinders 59. The amount of air leaving the regulator device 20 through outlet opening 51 depends upon the position of piston 34 relative to the row of outlet apertures 46. When the piston 34 is raised, it covers over more of the apertures 46 and less auxiliary air is fed from regulator device 20. When the piston 34 is lowered, it uncovers more apertures 46 and more auxiliary air is fed.

As long as the engine is operating, a fuel-air mixture is fed from carburetor 30, and its passage through the main venturi device 40 creates a low pressure or vacuum condition therein. Immediately above the main venturi device, there is an area of relatively higher pressure which is in communication with the air regulator device air chamber 27 above piston 33 through pipe 45. At the same time, the portion of air chamber 27 below piston 33 is in communication with the interior of main venturi device 40 through pipe 43. The portion of air chamber 27 below piston 33 is therefore provided with a low pressure or vacuum condition, while the portion of air chamber 27 above piston 33 is subjected to a higher pressure condition. This pressure differential urges the piston 33 downwardly in cylinder 22 against the tension of spring 37 and until these forces are equalized. Movement of piston 33 downwardly also moves piston 34 downwardly in lower cylinder 16, uncovering a portion of the row of apertures 46.

During certain engine operations, for example during idling or overrunning conditions, a greater vacuum is created in the main venturi device 40, resulting in a greater pressure differential in the portions of air chamber 27 above and below piston 33. This greater pressure differential causes the piston 34 to move further downwardly, uncovering more of the outlet apertures 46 and supplying a larger flow of auxiliary air to the auxiliary venturi devices 40a during conditions when such air is required.

The biasing force of spring 37 upon piston 34 may be selectively regulated by adjustment of screw 21 to provide a correct air supply during cruising conditions but at the same time to assure that the piston 34 is moved to the proper positions under varying operating conditions.

The provision of an individual air control valve 90 in association with each auxiliary venturi device 40a, makes possible the individual control of auxiliary air supplied to each engine cylinder 59. Thus, the variations in cylinder characteristics may be corrected and a balanced flow of auxiliary air supplied to each piston according to its individual requirements. The control valves 90 may be manually adjustable, or may be individually adjustable by remote control means, for example by electrical or automatic control.

It is well-known that firing differences in the various engine cylinders occur because spark plugs carbonize more rapidly in some cylinders than in others, valves burn faster in some cylinders, etc. These differences cause unequal burning of the fuel mixture from cylinder to cylinder with the result that gases are incompletely burned, and carbon monoxide, hydrogen gas and sulphurous acid is emitted. Such conditions cannot be corrected by carburetor settings. The system described herein, however, reduces the emission of obnoxious gases to a minimum and at the same time provides a more economical fuel consumption, by distributing to each cylinder sufficient auxiliary air for combining with the fuel mixture to obtain optimum combustion. The auxiliary air supply is also automatically adjusted to the operating condition of the engine whether the fuel mixture supplied is rich, lean, or normal for cruising. Vehicular engines for land, sea or air can be controlled by this system in accordance with the invention despite ambient temperature and pressure conditions.

Referring to FIG. 4, it will be noted that the air outlet apertures 46 gradually increase in size from the top to the bottom of the row in which they are arranged. This gradation in size enables the flow of auxiliary air to increase at an accelerated rate as the piston 34 is lowered in the air chamber 15 of regulating device 20.

It will be appreciated that the control system of the invention can be easily assembled into existing engines and carburetors without the necessity of physically changing the engine parts. Because of the venturi adapters and interconnecting members, it is only necessary to open the existing joints in the engine system and mount the venturi devices to thereby provide communication between the air regulating system and the interior of the engine system.

While a preferred embodiment of the invention has been shown and described herein, it is obvious that numerous additions, changes and omissions may be made in such embodiment without departing from the spirit and scope of the invention.

What I claim is:

1. In a multiple cylinder internal combustion engine including a manifold, a carburetor having an exit portion communicating with the manifold for feeding an air-fuel mixture thereto, and a plurality of engine cylinders, each having inlet portions communicating with the manifold for receiving the fuel-air mixture therefrom, an auxiliary air supply system for supplying supplemental air to the fuel mixture at the engine cylinder inlet portions in a quantity responsive to engine operating conditions, said auxiliary air supply system comprising air distributing members mounted in the inlet portions of the respective cylinders, an air regulator unit, means connecting said air regulator unit to a source of air external of said carburetor and to each of said air distributing members, sensing means in communication with said carburetor and responsive to the pressure of the air-fuel mixture fed to the manifold, control means within the air regulator unit for controlling the supplemental air fed therethrough to said cylinders, and means connecting said sensing means to said control means.

2. In a multiple cylinder internal combustion engine including a manifold, a carburetor having an exit portion communicating with the manifold for feeding an air-fuel mixture thereto, and a plurality of engine cylinders, each having inlet portions communicating with the manifold for receiving the fuel-air mixture therefrom, an auxiliary air supply system for supplying supplemental air to the fuel mixture at the engine cylinder inlet portions in a quantity responsive to engine operating conditions, said auxiliary air supply system comprising air distributing members mounted in the inlet portions of the respective cylinders, an air regulator unit, means connecting said air regulator unit to a source of air external of said carburetor and to each of said air distributing members, a venturi device mounted within the exit portion of the carburetor in position to receive therethrough the stream of air-fuel mixture fed to the manifold, control means within the air regulator unit for controlling the supplemental air fed therethrough to said cylinders, and means connecting said venturi device to said control means.

3. In a multiple cylinder internal combustion engine including a manifold, a carburetor having an exit portion communicating with the manifold for feeding an air-fuel mixture thereto, and a plurality of engine cylinders, each having inlet portions communicating with the manifold for receiving the fuel-air mixture therefrom, an auxiliary air supply system for supplying supplemental air to the fuel mixture at the engine cylinder inlet portions in a quantity responsive to engine operating conditions, said auxiliary air supply system comprising air distributing members mounted in the inlet portions of the respective cylinders, an air regulator unit having an inlet and an outlet, means connecting the inlet of said air regulator unit to a source of air external of said carburetor, means including a plurality of pipe branches connecting the air regulator unit outlet to each of said air distributing members, a venturi device mounted within the exit portion of the carburetor in position to receive therethrough the stream of air-fuel mixture fed to the manifold, control means within the air regulator unit for controlling the supplemental air fed therethrough to said cylinders, means connecting said venturi device to said control means, and valve means in each of said pipe branches for selectively adjusting the quantity of supplemental air flowing to each of said air distributing members in the respective cylinder inlet portions.

4. In a multiple cylinder internal combustion engine including a manifold, a carburetor having an exit portion communicating with the manifold for feeding an air-fuel mixture thereto, and a plurality of engine cylinders, each having inlet portions communicating with the manifold for receiving the fuel-air mixture therefrom, an auxiliary air supply system for supplying supplemental air to the fuel mixture at the engine cylinder inlet portions in a quantity responsive to engine operating conditions, said auxiliary air supply system comprising air distributing members mounted in the inlet portions of the respective cylinders, an air regulator unit, means connecting said air regulator unit to a source of air external of said carburetor and to each of said air distributing members, a venturi device mounted within the exit portion of the carburetor in position to receive therethrough the stream of air-fuel mixture fed to the manifold, control means within the air regulator unit for controlling the supplemental air fed therethrough to said cylinders and including a cylinder and a piston slidable therein, means connecting the interior of the cylinder at one side of the piston with said venturi device, and means connecting the interior of the cylinder at the other side of said piston with the interior of the carburetor upstream of said venturi device.

5. An auxiliary air supply system according to claim 4 in which said air regulator unit also includes a second cylinder and a second piston slidably mounted in said second cylinder and connected to said first piston for actuation thereby, said second cylinder having an inlet opening connected to said source of air and a plurality of outlet openings connected to said air distribution members, said second piston being adapted to selectively block and unblock successive outlet openings to vary the amount of supplemental air flowing through said air regulator unit when said second piston is reciprocated in said second cylinder.

6. An auxiliary air supply system according to claim 5 in which said outlet openings are arranged in a row and are of graduated size along said row.

7. An auxiliary air supply system according to claim 5 which also includes spring means urging said first piston in a direction to block said outlet openings, and means for adjusting the tension of said spring means.

8. An auxiliary air supply system according to claim 4 in which each air distributing member comprises an auxiliary venturi device positioned to receive the air-fuel mixture fed from the manifold to a respective engine cylinder, each venturi device having at least one through opening communicating with the interior thereof, and a branch conduit connecting said through opening with said air regulator unit for supplying supplemental air to the interior of said auxiliary venturi device.

9. An auxiliary air supply system according to claim 8 in which each branch conduit includes an air valve for selectively regulating the flow of supplemental air passing through said branch conduit to its respective auxiliary venturi device.

10. In a multiple cylinder internal combustion engine including a manifold, a carburetor having an exit portion communicating with the manifold for feeding an air-fuel mixture thereto, and a plurality of engine cylinders, each having inlet portions communicating with the manifold for receiving the fuel-air mixture therefrom, an auxiliary air supply system for supplying supplemental air to the fuel mixture at the engine cylinder inlet portions in a quantity responsive to engine operating conditions, said auxiliary air supply system comprising a main venturi device mounted within the exit portion of the carburetor in position to receive therethrough the stream of air-fuel mixture fed to the manifold, an air regulator unit having an air inlet opening and an air outlet opening, a plurality of auxiliary venturi devices mounted within the respective cylinder inlet portions, a first conduit connecting the air inlet opening of said regulator unit to a source of air external of said carburetor, a second conduit including conduit branches connecting the air outlet opening of said regulator unit to said auxiliary venturi devices, pressure-responsive control means within the air regulator unit for controlling the supplemental air fed therethrough to said cylinders, and a third conduit connecting the interior of said main venturi device to said control means for actuation of the latter in accordance with pressure conditions within said main venturi device.

11. An auxiliary air supply system according to claim 10 in which a fourth conduit connects the interior of said carburetor upstream of said main venturi device with said pressure-responsive control means in said air regulator unit, said control means being operable in response to the pressure differential between the interior of the main venturi device and said upstream interior portion of the carburetor.

12. An auxiliary air supply system according to claim 10 in which is included a mounting assembly for each venturi device, said mounting assembly including an adapter ring sized to seat said venturi device, said venturi device having a plurality of through openings extending from the interior to the exterior thereof, said adapter ring having a plurality of apertures communicating with the openings of the seated venturi device, and an interconnecting member sized to seat with said adapter ring, said interconnecting member having at least one bore communicating with the apertures of the seated adapter ring, and a coupling member terminating said bore, said coupling member being adapted to receive the conduit connected to said venturi device.

13. An auxiliary air supply system according to claim 12 in which the interconnecting member of the main venturi device is sized to fit within the joint between the carburetor and the manifold inlet, and the interconnecting members of the auxiliary venturi devices are sized to fit within the joints between the respective cylinders and the manifold outlet.

No references cited.